US012790220B2

(12) United States Patent
Huang et al.

(10) Patent No.: US 12,790,220 B2
(45) Date of Patent: Nov. 10, 2026

(54) ANTI-OXIDATION DIPPING TREATMENT METHOD FOR GRAPHITE SEALING ELEMENT FOR THERMAL POWER GENERATION UNIT, AND ANTI-OXIDATION PRODUCTION LINE

(71) Applicants: HUANENG POWER INTERNATIONAL, INC., Beijing (CN); XI'AN THERMAL POWER RESEARCH INSTITUTE CO., LTD., Xi'an (CN); YUHUAN BRANCH OF HUANENG (ZHEJIANG) ENERGY DEVELOPMENT CO., LTD, Yuhuan City (CN)

(72) Inventors: Jinyang Huang, Xi'an (CN); Xingxing Zhang, Xi'an (CN); Jintao Lu, Xi'an (CN); Yingying Dang, Xi'an (CN); Yongli Zhou, Xi'an (CN); Zhen Yang, Xi'an (CN); Yong Yuan, Xi'an (CN); Jingbo Yan, Xi'an (CN); Hongfei Yin, Xi'an (CN); Peng Zhang, Xi'an (CN); Pei Li, Xi'an (CN); Peng Liu, Xi'an (CN); Limin Li, Xi'an (CN); Wei Xiong, Xi'an (CN); Siyu Lin, Xi'an (CN); Qihuai Mao, Xi'an (CN)

(73) Assignees: HUANENG POWER INTERNATIONAL, INC., Beijing (CN); XI'AN THERMAL POWER RESEARCH INSTITUTE CO., LTD., Xi'an (CN); YUHUAN BRANCH OF HUANENG (ZHEJIANG) ENERGY DEVELOPMENT CO., LTD, Yuhuan City (CN)

( * ) Notice: Subject to any disclaimer, the term of this patent is extended or adjusted under 35 U.S.C. 154(b) by 162 days.

(21) Appl. No.: 18/837,148

(22) PCT Filed: Oct. 17, 2022

(86) PCT No.: PCT/CN2022/125668
§ 371 (c)(1),
(2) Date: Aug. 8, 2024

(87) PCT Pub. No.: WO2024/050924
PCT Pub. Date: Mar. 14, 2024

(65) Prior Publication Data

US 2025/0136449 A1 May 1, 2025

(30) Foreign Application Priority Data

Sep. 9, 2022 (CN) ......................... 202211107306.8

(51) Int. Cl.
*C01B 32/20* (2017.01)
*C01B 32/21* (2017.01)
*C09K 3/10* (2006.01)

(52) U.S. Cl.
CPC ............ *C01B 32/21* (2017.08); *C09K 3/1003* (2013.01); *C09K 2003/1084* (2013.01); *C09K 2200/0208* (2013.01)

(58) Field of Classification Search
CPC .. C09K 2003/1084; C09K 3/10; C01B 32/23; C01B 32/205; C01B 32/20
See application file for complete search history.

(56) References Cited

U.S. PATENT DOCUMENTS

2001/0038909 A1 11/2001 Mercuri et al.
2020/0165137 A1* 5/2020 Kutsumizu ............. B32B 27/08

FOREIGN PATENT DOCUMENTS

CN 102503546 A 6/2012
CN 103342582 A 10/2013
(Continued)

OTHER PUBLICATIONS

International Search Report and Written Opinion of the International Searching Authority dated Apr. 21, 2023 for PCT Patent application No. PCT/CN2022/125668.
(Continued)

*Primary Examiner* — Cedrick S Williams
(74) *Attorney, Agent, or Firm* — Maschoff Brennan

(57) ABSTRACT

An anti-oxidation dipping treatment method for a graphite sealing element for a thermal power generation unit, and an anti-oxidation production line. The anti-oxidation dipping treatment method for a graphite sealing element for a thermal power generation unit comprises the following steps: S1, placing a graphite sheet into a soaking device for soaking; S2, conveying the soaked graphite sheet into a drying and curing device for drying and curing; S3, stacking the multiple dried and cured graphite sheets together, and subjecting same to compression molding to form a layered
(Continued)

graphite body; and S4, stamping the layered graphite body to form a finished graphite sealing element with a desired appearance.

9 Claims, 1 Drawing Sheet

(56) References Cited

FOREIGN PATENT DOCUMENTS

| | | | | | |
|---|---|---|---|---|---|
| CN | 109216713 | A | | 1/2019 | |
| CN | 210474485 | U | | 5/2020 | |
| CN | 113402299 | A | | 9/2021 | |
| CN | 114604869 | A | * | 6/2022 | ........... C01B 32/225 |
| CN | 114725417 | A | | 7/2022 | |
| GB | 1125124 | A | | 8/1968 | |

OTHER PUBLICATIONS

First Office Action dated Mar. 30, 2023 for CN patent application No. 202211107306.8.

Second Office Action dated Jul. 15, 2023 for CN patent application No. 202211107306.8.

* cited by examiner

ANTI-OXIDATION DIPPING TREATMENT METHOD FOR GRAPHITE SEALING ELEMENT FOR THERMAL POWER GENERATION UNIT, AND ANTI-OXIDATION PRODUCTION LINE

CROSS-REFERENCE TO RELATED APPLICATIONS

The present application claims priority to Chinese Patent Application No. 202211107306.8, filed to the China National Intellectual Property Administration on Sep. 9, 2022 and entitled "ANTI-OXIDATION DIPPING TREATMENT METHOD FOR GRAPHITE SEALING ELEMENT FOR THERMAL POWER GENERATION UNIT, AND ANTI-OXIDATION PRODUCTION LINE", the entire content of which is incorporated herein by reference.

TECHNICAL FIELD

The present application relates to the technical field of machining of graphite sealing elements, in particular to an anti-oxidation dipping treatment method for a graphite sealing element for a thermal power generation unit, and an anti-oxidation production line.

BACKGROUND

Flexible graphite is a novel carbon graphite material that has been developed in the 1960s, and has been widely applied in the aspect of sealing of various pumps, valves and kettles in the fields of petrochemical industry, nuclear power industry, energy and the like due to a series of excellent properties such as light weight, softness, low hardness, high rebound rate, small stress relaxation, high chemical stability and high radiation resistance.

Failure of a sealing component in a high-temperature environment in the fields of energy and petrochemical industry is prone to causing various leakage accidents, and the fatal weakness of thermo-oxidative aging of the sealing component is obvious; and to improve characteristics of the flexible graphite and improve high temperature oxidation resistance thereof is a key problem urgent to be solved at present.

At present, common solutions for improving oxidation resistance of a graphite sealing element mainly include a dipping method, a coating method, a self-healing method and a technical method. The dipping method is a main method for fabricating a graphite scaling element with high oxidation resistance. The dipping method is to soak the graphite scaling element in a dipping agent (an organic material or an inorganic liquid material), make the dipping agent enter pores of the graphite sealing element under a high-pressure environment and perform curing, so as to achieve the purpose of high-temperature oxidation resistance, and this method is easy and convenient to operate and low in cost and has been widely applied to graphite sealing materials of various high-temperature sealing elements.

However, there are a great variety of dipping agents, most of them are organic matters with high viscosity and poor fluidity, such as phenolic resin, furfural acetone resin, furfuran resin, coal pitch, organic silicon resin, sodium silicate, paraffin, polytetrafluoroethylene suspension and epoxy resin, complete soaking of the graphite sealing element is usually difficult to implement during a soaking process, and complete soaking of a high-density graphite plate is also difficult even under a high-pressure environment. Though chemical stability, a thermal property and a mechanical property of the dipped graphite sealing element are all improved, with continuous consumption of a surface-layer dipped portion of a graphite layer in a high-temperature environment, high oxidation resistance of internal-layer graphite will be difficult to remain, and the oxidation resistance of the graphite sealing element will also be apparently insufficient after long-time service.

Therefore, there is an urgent need for developing a production method and a production line capable of fabricating a completely dipped flexible graphite sealing element.

SUMMARY OF THE INVENTION

Thus, a technical problem to be solved by the present application is to overcome defects that in the prior art, the graphite sealing element cannot be soaked completely, and an internal layer of the graphite sealing element cannot meet the requirement for high temperature oxidation resistance after an external oxidation resistance layer is consumed, so as to provide an anti-oxidation dipping treatment method for a graphite sealing element for a thermal power generation unit, and an anti-oxidation production line.

To solve the above technical problem, technical solutions of the present application are as follows.

An anti-oxidation dipping treatment method for a graphite sealing element for a thermal power generation unit includes the following steps:

- S1: placing a graphite sheet into a soaking device for soaking;
- S2: conveying the soaked graphite sheet into a drying and curing device for drying and curing;
- S3: stacking the multiple dried and cured graphite sheets together, and subjecting same to compression molding to form a layered graphite body; and
- S4: stamping the layered graphite body to form a finished graphite sealing element with a desired appearance.

Further, the graphite sealing element is a flexible graphite sealing element.

Further, in step S1, soaking time ranges from 4 min to 7 min; in step S2, drying is performed at a temperature ranging from 240° C. to 260° C. for 18 min to 22 min, and curing is performed at a temperature ranging from 380° C. to 420° C. for 8 min to 12 min; in step S3, a load pressure ranges from 75 Mpa to 95 Mpa, and pressure maintaining time ranges from 10 min to 20 min; and in step S4, a stamping mold (81) performs stamping at a stamping rate ranging from 9 cm/s to 11 cm/s and a stamping frequency ranging from 5 times/hour to 7 times/hour.

The technical solutions of the present application have the following advantages.

1. In the anti-oxidation dipping treatment method for the graphite sealing element for the thermal power generation unit in the present application, before the graphite sealing element is completed, the raw material, namely, the graphite sheets, for fabricating the graphite sealing element is completely dipped, each whole graphite sheet has good oxidation resistance, and thus the graphite sealing element obtained after being soaked by the soaking device and machined and treated by the drying and curing device, a compression molding device and a finished product machining device has good oxidation resistance per se, that is, the oxidation resistance of other portions of the graphite sealing element will not be affected in spite of consumption of an anti-oxidation layer in any position of the finished graphite sealing element; and compared with a graphite element production method in the prior art that a finished graphite element with a desired appearance is obtained first and then the finished graphite element is put in a dipping agent for dipping, the anti-oxidation dipping treatment method has advantages of being high in soaking efficiency, good in product structure compactness, excellent in oxidation resistance and the like and can remarkably prolong the service life of the graphite sealing element.

An anti-oxidation production line for a graphite sealing element for a thermal power generation unit includes a guide rail; and a soaking device, a drying and curing device, a compression molding device and a finished product machining device which are arranged below the guide rail and in sequence along a guiding direction of the guide rail; wherein the soaking device includes a soaking tank, and the soaking tank is configured to contain a dipping agent so as to completely soak a graphite sheet; the drying and curing device includes a drying and curing oven for drying and curing the soaked graphite sheet therein; the compression molding device includes a compressing mechanism mounted on the guide rail, a support stand for stacking the multiple dried and cured graphite sheets thereon, and a push mechanism which pushes the support stand to move to a position below the compressing mechanism, and the compressing mechanism is configured to compress the multiple stacked graphite sheets on the support stand to form a layered graphite body; the finished product machining device includes a feeding tank configured to contain the layered graphite body and a stamping mold slidably mounted on the guide rail, and the stamping mold is configured to perform stamping machining on the layered graphite body in the feeding tank to form a graphite sealing element with a desired appearance; and the guide rail is also slidably connected with a material transfer device suitable for grabbing materials and driving the materials to be transferred between different devices.

Further, a first conveying mechanism is further arranged in the soaking tank and configured to drive the graphite sheet to perform circularly reciprocating motion in the soaking tank.

Further, the anti-oxidation production line for the graphite sealing element for the thermal power generation unit further includes a second conveying mechanism, a third conveying mechanism and a fourth conveying mechanism; wherein the second conveying mechanism traverses the drying and curing oven and is configured to drive the graphite sheet located in the drying and curing oven to move towards the push mechanism, and the third conveying mechanism is located below the compressing mechanism and configured to transfer the support stand and the layered graphite body on the support stand towards the finished product machining device; the finished product machining device further includes a discharging tank located below the feeding tank, and the finished graphite sealing element obtained after stamping machining in the feeding tank enters the discharging tank; and the fourth conveying mechanism is located below the discharging tank and configured to remove the discharging tank and the finished graphite sealing element in the discharging tank out of the stamping mold.

Further, the material transfer device includes a first suction device and a second suction device located on the guide rail on two opposite sides of the compressing mechanism; and the first suction device is configured to suck the graphite sheet and drive the graphite sheet to be transferred among the soaking tank, the drying and curing oven and the support stand, and the second suction device is configured to suck the layered graphite body and drive the layered graphite body to be transferred between the support stand and the feeding tank.

Further, the anti-oxidation production line for the graphite sealing element for the thermal power generation unit further includes a support base, wherein the soaking device, the drying and curing device, the compression molding device and the finished product machining device are all fixed on the support base.

Further, the anti-oxidation production line for the graphite sealing element for the thermal power generation unit further includes a first moving trolley and a second moving trolley located at two ends of the support base respectively; wherein the first moving trolley transfers the graphite sheet to the soaking device, and the graphite sheet is sucked by the first suction device slidably mounted on the guide rail to be put in the soaking device; and a top surface of the second moving trolley is flush with a top surface of the fourth conveying mechanism, so the graphite sealing element obtained by the finished product machining device is transferred.

The technical solutions of the present application have the following advantages.

1. In the anti-oxidation production line for the graphite sealing element for the thermal power generation unit provided by the present application, before the finished graphite scaling element is machined by the finished product machining device, the graphite sheets used for fabricating the graphite sealing element have been soaked in an anti-oxidation dipping agent in the soaking device, the graphite sheets are quite thin and can be completely dipped in the dipping agent during a soaking process, each whole graphite sheet has good oxidation resistance, and thus the graphite sealing element obtained after being soaked by the soaking device and machined and treated by the drying and curing device, the compression molding device and the finished product machining device also has good oxidation resistance per se, that is, the oxidation resistance of other portions of the graphite sealing element will not be affected in spite of consumption of the anti-oxidation layer in any position of the finished graphite sealing element; and compared with a manner of a graphite element production device in the prior art that a finished graphite element with a desired appearance is obtained first and then the finished graphite element is put in a dipping agent, the anti-oxidation production line has advantages of being high in soaking efficiency, good in product structure compactness, excellent in oxidation resistance and the like and can remarkably prolong the service life of the graphite sealing element.

2. In the anti-oxidation production line for the graphite sealing element for the thermal power generation unit provided by the present application, through arrangement and cooperation of the first moving trolley, the second moving trolley, the material transfer device, the first conveying mechanism, the second conveying mechanism, the third conveying mechanism and the fourth conveying mechanism, automation of the anti-oxidation production line for the graphite sealing element for the thermal power generation unit can be achieved, and manpower cost is reduced.

3. In the anti-oxidation production line for the graphite sealing element for the thermal power generation unit provided by the present application, the production process is simple and highly efficient, high-temperature heat treatment is not needed, energy consumption is low, and the production line is economical.

BRIEF DESCRIPTION OF THE DRAWINGS

In order to more clearly describe specific implementations of the present application or technical solutions in the prior art, accompanying drawings needed by the description in the specific implementations or in the prior art will be briefly introduced below. Apparently, the accompanying drawings in the following description are some implementations of the present application. Those ordinarily skilled in the art can also obtain other accompanying drawings according to these accompanying drawings without making creative work.

DESCRIPTIONS OF REFERENCE NUMERALS

1, support base; 2, guide rail; 3, ultrasonic cleaning device; 4, forced air drying device; 5, soaking device; 6, drying and curing device; 61, drying device; 62, curing device; 7, compression molding device; 71, push mechanism; 72, compressing mechanism; 73, support stand; 8, finished product machining device; 81, stamping mold; 82, feeding tank; 83, discharging tank; 90, power roller; 91, first conveying mechanism; 92, second conveying mechanism; 93, third conveying mechanism; 94, fourth conveying mechanism; 11, first moving trolley; 12, second moving trolley; 111, graphite sheet; 112, layered graphite body; 113, graphite sealing element; 21*a*, first suction device; and 21*b*, second suction device.

DETAILED DESCRIPTION

The technical solutions of the present application will be clearly and completely described in the following with reference to the accompanying drawings. Apparently, the described embodiments are merely some rather than all of the embodiments of the present application. All other embodiments obtained by those ordinarily skilled in the art based on the embodiments in the present application without making creative efforts fall within the protection scope of the present application.

In the description of the present application, it needs to be noted that directions or position relations indicated by terms such as “center”, “upper”, “lower”, “left”, “right”, “vertical”, “horizontal”, “inner” and “outer” are directions or position relations as shown in the accompanying drawings and are only intended to conveniently describe the present application and simplify the description but not to indicate or imply that a device or element referred to necessarily has a specific direction or is constructed and operated in a specific direction, so as not to be understood as a limitation on the present application. Besides, terms “first”, “second” and “third” are only used for the description instead of being understood as indicating or implying a relative significance.

It needs to be noted that in the description of the present application, unless otherwise specified and defined clearly, terms “mount”, “connected”, and “connecting” are to be understood in a broad sense, for example, it may be a fixed connection, or a detachable connection, or an integrated connection; it may be a mechanical connection or an electrical connection; and it may be a direct connection, or an indirect connection through an intermediate medium, or internal communication between two elements. Specific meanings of the above terms in the present application may be understood by those ordinarily skilled in the art according to specific conditions.

Besides, technical features involved in different implementations of the present application described below may be combined mutually as long as no conflict exists between one another.

Example 1

Figure 1:
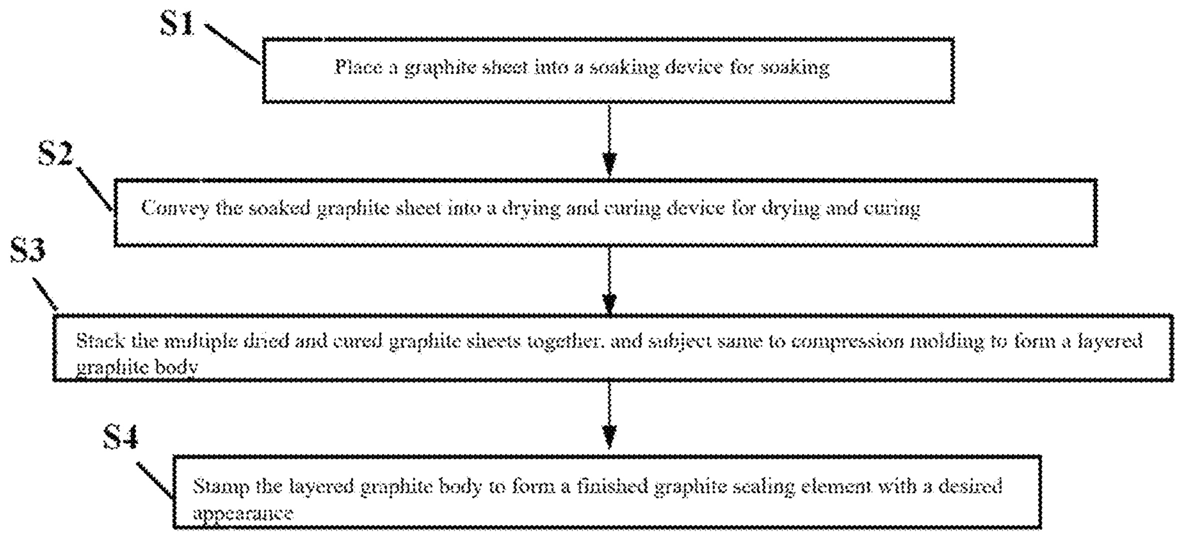
FIG. 1 is a flowchart of an anti-oxidation dipping treatment method for a graphite sealing element for a thermal power generation unit in the present application.
Figure 2:
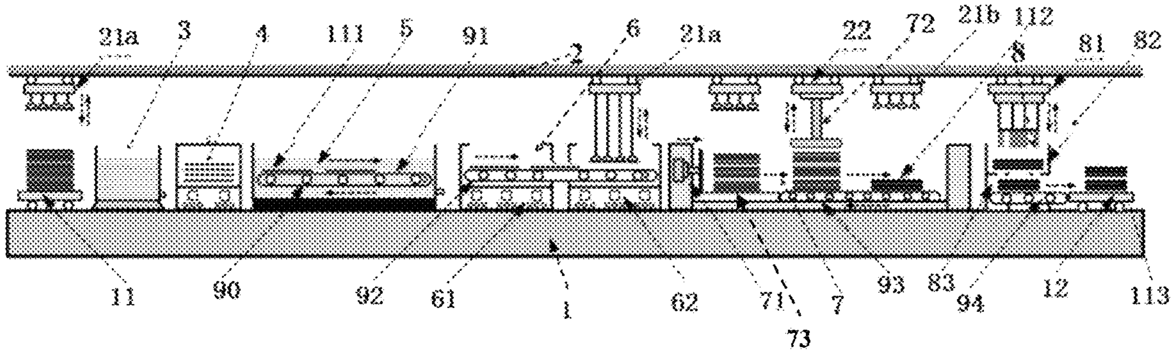
FIG. 2 is a schematic diagram of an anti-oxidation production line for a graphite sealing element for a thermal power generation unit in the present application.

As shown in FIG. 1 and FIG. 2, this embodiment provides an anti-oxidation dipping treatment method for a graphite sealing element for a thermal power generation unit, including the following steps.

S1: a graphite sheet 111 is placed in a soaking device 5 for soaking, wherein a selected dipping agent is a mixture of phosphoric acid and phosphates, soaking time of the graphite sheet 111 ranges from 4 min to 7 min, a dipping temperature ranges from 72° C. to 77° C., certainly, selection for the soaking time, the dipping temperature and the dipping agent may be not limited to this as long as different graphite sheets 111 can be completely dipped.

S2: the soaked graphite sheet 111 is conveyed into a drying and curing device 6 for drying and curing, wherein drying is performed at a temperature ranging from 240° C. to 260° C. for 18 min to 22 min, and curing is performed at a temperature ranging from 380° C. to 420° C. for 8 min to 12 min.

S3: the multiple dried and cured graphite sheets 111 are stacked together, and subjected to compression molding to form a layered graphite body 112, wherein a load pressure ranges from 75 Mpa to 95 Mpa, and pressure maintaining time ranges from 10 min to 20 min.

S4: the layered graphite body 112 is stamped to form a finished graphite sealing element 113 with a desired appearance, wherein a stamping mold 81 performs stamping at a stamping rate ranging from 9 cm/s to 11 cm/s and a stamping frequency ranging from 5 times/hour to 7 times/hour.

Before the graphite sealing element is completed, the raw material, namely, the graphite sheets 111, for fabricating the graphite sealing element is completely dipped, each whole graphite sheet 111 has good oxidation resistance, and thus the graphite sealing element 113 obtained after being soaked by the soaking device 5 and machined and treated by the drying and curing device 6, a compression molding device 7 and a finished product machining device 8 has good oxidation resistance per se, that is, the oxidation resistance of other portions of the graphite sealing element 113 will not be affected in spite of consumption of an anti-oxidation layer in any position of the finished graphite sealing element 113; and compared with a graphite element production method in the prior art that a finished graphite element with a desired appearance is obtained first and then the finished graphite element is put in a dipping agent for dipping, the anti-oxidation dipping treatment method has advantages of being high in soaking efficiency, good in product structure compactness, excellent in oxidation resistance and the like and can remarkably prolong the service life of the graphite sealing element.

Certainly, if the graphite sheet 111 is not cleaned before entering the soaking device 5, the graphite sheet 111 needs to be cleaned and then placed in the soaking device 5, and correspondingly, before step S1, the anti-oxidation dipping treatment method for the graphite sealing element for the thermal power generation unit further needs to include the following steps.

S01: the graphite sheet 111 is placed in an ultrasonic cleaning device 3 to be completely cleaned, wherein time for dynamic cleaning ranges from 8 s to 12 s, and a cleaning fluid is a mixture of ethyl alcohol, a pickling solution and the like.

S02: the cleaned graphite sheet 111 is placed in a forced air drying device 4 to be fully dried, wherein a drying temperature ranges from 105° C. to 115° C., and drying time ranges from 28 s to 32 s.

The anti-oxidation dipping treatment method for the graphite sealing element for the thermal power generation unit in this embodiment will be introduced below by taking production of a flexible graphite sealing element for a valve of the thermal power generation unit as an example. The flexible graphite sheet 111 with a single-layer thickness being 0.66 μm is selected as the production raw material, the mixture of the ethyl alcohol, the pickling solution and the like is selected as the cleaning fluid, the mixture of the phosphoric acid and the phosphates is selected as the dipping agent, and a metal net made of Super304H stainless steel wires with a diameter being 150 μm and having a mesh size being 500 μm is selected as a supporting frame.

Embodiment 1

(1) Preparation before production: a plurality of flexible graphite sheets 111 each of which has a thickness of 0.66 μm are placed on a first moving trolley 11, a cleaning fluid is injected into an ultrasonic cleaning device 3, a dipping agent is injected into a circulating soaking device 5, and a temperature of the dipping agent ranges from 72° C. to 77° C. (optionally, 75° C.).

(2) Setting of technological parameters for production: a forced air drying device 4 is started, and a temperature is set to range from 105° C. to 115° C. (optionally, 110° C.); a drying device 61 with a temperature set to range from 240° C. to 260° C. (optionally, 250° C.) and a curing device 62 with a temperature set to range from 380° C. to 420° C. (optionally, 400° C.) are started; a load pressure of a compressing mechanism 72 (in this embodiment, the compressing mechanism 72 is a hydraulic mechanism) is set to range from 75 Mpa to 95 Mpa (optionally, 80 Mpa), and pressure maintaining time is set to range from 10 min to 20 min (optionally, 10 min); and a stamping mold 81 performs stamping at a stamping rate set to range from 9 cm/s to 11 cm/s (optionally, 10 cm/s) and a stamping frequency set to range from 5 times/hour to 7 times/hour (optionally, 6 times/hour), and a conveying rate of each conveying mechanism is adjusted in real time according to production efficiency.

(3) Production of a product of a graphite sealing element:

a single layer of flexible graphite sheet 111 is sucked from the first moving trolley 11 by using a first suction device 21*a* and placed into the ultrasonic cleaning device 3 for dynamic cleaning for 8 s to 12 s (optionally, 10 s);

the cleaned flexible graphite sheet 111 is dried for 28 s to 32 s (optionally, 30 s) by using the forced air drying device 4;

the dried flexible graphite sheet 111 is placed into the circulating soaking device 5 to be dynamically soaked for 4 min to 7 min (optionally, 5 min) along with a first conveying mechanism 91;

the soaked flexible graphite sheet 111 is placed into a drying and curing device 6 to be dried for 18 min to 22 min (optionally, 20 min) and then cured for 8 min to 12 min (optionally, 10 min), and the dried and cured flexible graphite sheet 111 is transferred to a compression molding device 7 by using a second conveying mechanism 92;

the cured flexible graphite sheet 111 is sucked by using the first suction device 21*a*, placed onto a support stand 73 of the compression molding device 7, and stacked in order, a stacking quantity is adding one metal net supporting frame for every 1000 flexible graphite sheets 111, a total stacking is 10 cycles, the stacked flexible graphite sheets 111 are pushed into a position under the compressing mechanism 72 by a push mechanism 71, pressure maintaining is performed in a pressure ranging from 75 Mpa to 95 Mpa (optionally, 80 Mpa) for 10 min to 20 min (optionally, 10 min) to compress the stacked flexible graphite sheets 111 into a layered graphite body 112, and the layered graphite body 112 is transferred to a finished product machining device 8 by using a third conveying mechanism 93; and the layered graphite body 112 is placed into a feeding tank 82 of the finished product machining device 8, the stamping mold 81 performs stamping at a stamping rate ranging from 9 cm/s to 11 cm/s (optionally, 10 cm/s) to form a flexible graphite sealing element, specifically a flexible graphite sealing ring, with an outer diameter being 50 mm, a wall thickness being 5 mm and a length being 4.5 mm, the flexible graphite sealing element falls into a discharging tank 83 to be conveyed with a fourth conveying mechanism 94 onto a second moving trolley 12, and thus production of the flexible graphite sealing ring for a valve of a thermal power generation unit is completed.

Preparation before production and setting of the technological parameters for production are not necessarily performed every time the anti-oxidation dipping treatment method for the graphite sealing element for the thermal power generation unit is carried out, which may be selected as required.

Embodiment 2

(1) Preparation before production: a plurality of flexible graphite sheets 111 each of which has a thickness of 0.66 μm are placed on a first moving trolley 11, a cleaning fluid is injected into an ultrasonic cleaning device 3, a dipping agent is injected into a circulating soaking device 5, and a temperature of the dipping agent ranges from 72° C. to 77° C. (optionally, 75° C.).

(2) Setting of technological parameters for production: a forced air drying device 4 is started, and a temperature is set to range from 105° C. to 115° C. (optionally, 110° C.); a drying device 61 with a temperature set to range from 240° C. to 260° C. (optionally, 250° C.) and a curing device 62 with a temperature set to range from 380° C. to 420° C. (optionally, 400° C.) are started; a load pressure of a compressing mechanism 72 (in this embodiment, the compressing mechanism 72 is a hydraulic mechanism) is set to range from 75 Mpa to 95 Mpa (optionally, 80 Mpa), and pressure maintaining time is set to range from 10 min to 20 min (optionally, 10 min); and a stamping mold 81 performs stamping at a stamping rate set to range from 9 cm/s to 11 cm/s (optionally, 10 cm/s) and a stamping frequency set to range from 5 times/hour to 7 times/hour (optionally, 6 times/hour), and a conveying rate of each conveying mechanism is adjusted in real time according to production efficiency.

(3) Production of a product of a graphite sealing element:

a single layer of flexible graphite sheet 111 is sucked from the first moving trolley 11 by using a first suction device 21*a* and placed into the ultrasonic cleaning device 3 for dynamic cleaning for 8 s to 12 s (optionally, 10 s);

the cleaned flexible graphite sheet 111 is dried for 28 s to 32 s (optionally, 30 s) by using the forced air drying device 4;

the dried flexible graphite sheet 111 is placed into the circulating soaking device 5 to be dynamically soaked for 4 min to 7 min (optionally, 5 min) along with a first conveying mechanism 91;

the soaked flexible graphite sheet 111 is placed into a drying and curing device 6 to be dried for 18 min to 22 min (optionally, 20 min) and then cured for 8 min to 12 min (optionally, 10 min), and the dried and cured flexible graphite sheet 111 is transferred to a compression molding device 7 by using a second conveying mechanism 92;

the cured flexible graphite sheet 111 is sucked by using the first suction device 21*a*, placed onto a support stand 73 of the compression molding device 7, and stacked in order, a stacking quantity is adding one metal net supporting frame for every 3000 flexible graphite sheets, a total stacking is 5 cycles, the stacked flexible graphite sheets are pushed into a position under the compressing mechanism 72 by a push mechanism 71, pressure maintaining is performed in a pressure ranging from 75 Mpa to 95 Mpa (optionally, 80 Mpa) for 13 min to 17 min (optionally, 15 min) to compress the stacked flexible graphite sheets into a layered graphite body 112, and the layered graphite body 112 is transferred to a finished product machining device 8 by using a third conveying mechanism 93; and the layered graphite body 112 is placed into a feeding tank 82 of the finished product machining device 8, the stamping mold 81 performs stamping at a stamping rate of 10 cm/s to form a flexible graphite sealing element, specifically a flexible graphite sealing ring, with an outer diameter being 50 mm, a wall thickness being 5 mm and a length being 6 mm, the flexible graphite sealing element falls into a discharging tank 83 to be conveyed with a fourth conveying mechanism 94 to a second moving trolley 12, and thus production of the flexible graphite sealing ring for a valve of a thermal power generation unit is completed.

Preparation before production and setting of the technological parameters for production are not necessarily performed every time the anti-oxidation dipping treatment method for the graphite sealing element for the thermal power generation unit is carried out, which may be selected as required.

It needs to be additionally noted that the anti-oxidation dipping treatment method for the graphite sealing element for the thermal power generation unit in this embodiment is also suitable for other thin graphite sheets or graphite plates, but different types of graphite sheets or graphite plates have different strengths and toughness, so production parameters need to be determined through conventional tests, which is easy to implement for those skilled in the art.

Example 2

As shown in FIG. 2, this embodiment provides an anti-oxidation production line for a graphite sealing element for a thermal power generation unit, including a guide rail 2; and a soaking device 5, a drying and curing device 6, a compression molding device 7 and a finished product machining device 8 which are arranged below the guide rail 2 and in sequence along a guiding direction of the guide rail 2.

The soaking device 5 includes a soaking tank, and the soaking tank is configured to contain a dipping agent so as to completely soak a graphite sheet 111. The dipping agent, as a key material for improving high temperature oxidation resistance of a graphite sealing element 113, may be selected according to anti-oxidation needs and service environments of different graphite sealing elements 113 and is not limited to the only one type, and in this embodiment, a commercial graphite antioxidant is selected and has a major component of phosphates. A first conveying mechanism 91 is further arranged in the soaking tank, and the first conveying mechanism 91 is configured to drive the graphite sheet 111 under driving of a power roller 90 to perform circularly reciprocating motion in the soaking tank, so the soaking device 5 may be also called a circulating soaking device; and the first conveying mechanism 91 may automatically move the graphite sheet 111 from one end of the soaking tank to the other end of the soaking tank, a soaking manner of the graphite sheet 111 circularly moving in the soaking device 5 may prevent too low concentration of a local antioxidant in the dipping agent from affecting a dipping effect, thus dipping efficiency of the graphite sheet 111 is beneficially improved, and time for completely soaking the graphite sheet 111 is shortened. Certainly, the graphite sheet 111 may also be statically soaked in the soaking device 5.

The drying and curing device 6 includes a drying and curing oven, the drying and curing oven is configured to dry and cure the soaked graphite sheet 111 therein, so that the dipping agent completely coats the graphite sheet 111, and a drying device 61 and a curing device 62 are arranged in the drying and curing oven.

The compression molding device 7 includes a compressing mechanism 72 mounted on the guide rail 2, a support stand 73 (not marked) for stacking the multiple dried and cured graphite sheets 111 thereon, and a push mechanism 71 for pushing the support stand 73 to move to a position below the compressing mechanism 72, and the compressing mechanism 72 is configured to compress the multiple stacked graphite sheets 111 on the support stand 73 to form a layered graphite body 112. In this embodiment, the compressing mechanism 72 is a hydraulic mechanism and certainly may also be an electric or pneumatic compressing mechanism 72, which is not specifically limited here.

The finished product machining device 8 includes a feeding tank 82 configured to contain the layered graphite body 112 and a stamping mold 81 slidably mounted on the guide rail 2, and the stamping mold 81 is configured to perform stamping machining on the layered graphite body 112 in the feeding tank 82 to form the graphite sealing element 113 with a desired appearance; and the guide rail 2 is also slidably connected with a material transfer device suitable for grabbing materials and driving the materials to be transferred between the soaking device 5, the drying and curing device 6, the compression molding device 7 and the finished product machining device 8. The finished product machining device 8 further includes a discharging tank 83 located below the feeding tank 82, and the stamped finished graphite sealing element 113 in the feeding tank 82 enters the discharging tank 83.

In the anti-oxidation production line for the graphite sealing element for the thermal power generation unit, before the finished graphite sealing element 113 is machined by the finished product machining device 8, the graphite sheets 111 used for fabricating the graphite sealing element 113 have been soaked in the anti-oxidation dipping agent in the soaking device 5, the graphite sheets 111, for example, flexible graphite sheets, are quite thin each of which has a thickness of only about 0.66 μm and can thus be completely dipped in the dipping agent during a soaking process, each whole graphite sheet 111 has good oxidation resistance, and thus the graphite sealing element 113 obtained after being soaked by the soaking device 5 and machined and treated by the drying and curing device 6, the compression molding device 7 and the finished product machining device 8 also has good oxidation resistance per se, that is, the oxidation resistance of other portions of the graphite sealing element 113 will not be affected in spite of consumption of any position of the finished graphite sealing element 113; and compared with a manner that a finished graphite sealing element with a desired appearance is obtained first and then the finished graphite scaling element is put in a dipping agent, the anti-oxidation production line has advantages of being high in soaking efficiency, good in product structure compactness, excellent in oxidation resistance and the like and can remarkably prolong the service life of the graphite sealing element. In contrast, in the prior art, the obtained finished graphite element is soaked in the dipping agent, as the finished graphite element has been compressed and stamped-molded and is compact in texture per se, an anti-oxidation layer can be formed only on a surface of the graphite element during the soaking process. However, during a long-time service process, after the anti-oxidation layer on the surface of the graphite element is consumed, oxidation resistance of the remaining graphite element is close to zero, so the graphite element, as a sealing element, fails and then increases a leakage risk.

In order to improve the automation degree of the anti-oxidation production line for the graphite sealing element for the thermal power generation unit, the anti-oxidation production line for the graphite sealing element for the thermal power generation unit further includes a second conveying mechanism 92, a third conveying mechanism 93 and a fourth conveying mechanism 94; wherein the second conveying mechanism 92 traverses the drying and curing oven and is configured to drive the graphite sheet 111 located in the drying and curing oven to move towards the push mechanism 71, and the third conveying mechanism 93 is located below the compressing mechanism 72 and configured to transfer the support stand 73 and the layered graphite body 112 on the support stand 73 towards the finished product machining device 8; and the fourth conveying mechanism 94 is located below the stamping mold 81 and configured to remove the discharging tank 83 and the finished graphite sealing element 113 in the discharging tank 83 out of the stamping mold 81.

The aforementioned material transfer device includes a first suction device 21*a* and a second suction device 21*b* located on the guide rail 2 upstream and downstream of the compressing mechanism 72; the first suction device 21*a* is configured to suck the graphite sheet 111 and drive the graphite sheet 111 to be transferred among the soaking tank, the drying and curing oven and the support stand 73; and the second suction device 21*b* is configured to suck the layered graphite body 112 and drive the layered graphite body 112 to be transferred between the support stand 73 and the feeding tank 82. In this embodiment, the first suction device 21*a* and the second suction device 21*b* each include a lifting mechanism and a vacuum suction cup mounted at a movable end of the lifting mechanism, wherein the vacuum suction cup sucks a material, and the lifting mechanism drives the vacuum suction cup to ascend or descend.

The above arrangement of the material transfer device, the first conveying mechanism 91, the second conveying mechanism 92, the third conveying mechanism 93 and the fourth conveying mechanism 94 is for the purpose of achieving automation of the anti-oxidation production line for the graphite sealing element for the thermal power generation unit, and reducing manpower cost.

The anti-oxidation production line for the graphite sealing element for the thermal power generation unit further includes a support base 1, and the soaking device 5, the drying and curing device 6, the compression molding device 7 and the finished product machining device 8 are all fixed to the support base 1. Certainly, the support base 1 is not necessary and may be arranged as required.

In addition, for conveniently conveying the graphite sheet 111 and the finished graphite sealing element 113, the anti-oxidation production line for the graphite sealing element for the thermal power generation unit further includes a first moving trolley 11 and a second moving trolley 12 located at two ends of the support base 1 respectively; the first moving trolley 11 transfers the graphite sheet 111 to the soaking device 5, and the graphite sheet 111 is sucked and placed in the soaking device 5 by the first suction device 21*a* slidably mounted on the guide rail 2; and a top surface of the second moving trolley 12 is flush with a top surface of the fourth conveying mechanism 94, so the graphite sealing element 113 is conveniently and directly transferred from the top surface of the fourth conveying mechanism 94 to the top surface of the second moving trolley 12, and then the graphite sealing element 113 obtained by the finished product machining device 8 is transferred.

Certainly, if the graphite sheet 111 is not cleaned before entering the soaking device 5, the graphite sheet 111 needs to be cleaned and then placed in the soaking device 5, correspondingly, the anti-oxidation production line for the graphite sealing element for the thermal power generation unit further needs to include an ultrasonic cleaning device 3 and a forced air drying device 4 located upstream of the soaking device 5, the ultrasonic cleaning device 3 includes a cleaning tank, and the cleaning tank is configured to contain a cleaning fluid for performing ultrasonic cleaning on the graphite sheet 111; and the forced air drying device 4 is located between the ultrasonic cleaning device 3 and the soaking device 5 and configured to dry the cleaned graphite sheet 111. The above first suction device 21*a* is further configured to suck the graphite sheet 111 and drive the graphite sheet 111 to be transferred among the ultrasonic cleaning device 3, the forced air drying device 4 and the soaking device 5. Correspondingly, the ultrasonic cleaning device 3 and the forced air drying device 4 are fixed to the support base 1, and the first moving trolley 11 transfers the graphite sheet 111 to the ultrasonic cleaning device 3 but not to the soaking device 5.

A production process of the anti-oxidation production line for the graphite sealing element for the thermal power generation unit in this embodiment is introduced below.

The graphite sheet 111 is conveyed to the ultrasonic cleaning device 3 by using the first moving trolley 11;

the first suction device 21*a* sucks a single layer of graphite sheet 111 and places the same into the ultrasonic cleaning device 3 to be completely cleaned;

the cleaned graphite sheet 111 is placed in the forced air drying device 4 to be fully dried;

the dried flexible graphite sheet 111 is placed into the soaking device 5 to be dynamically soaked for a long time along with the first conveying mechanism 91;

the soaked graphite sheet 111 is placed into the drying and curing device 6 to be dried and cured, and then transferred to the compression molding device 7 by using the second conveying mechanism 92;

the cured flexible graphite sheet 111 is sucked by the first suction device 21*a*, stacked on the support stand 73 of the compression molding device 7 in order, and pushed by the push mechanism 71 of the compression molding device 7 into a position under the compressing mechanism 72 to be compressed, so as to obtain the layered graphite body 112, and the layered graphite body 112 is transferred by the third conveying mechanism 93 to the finished product machining device 8;

the layered graphite body 112 is placed into the feeding tank 82 of the finished product machining device 8 by using the second suction device 21*b*, the graphite sealing element 113 is machined under stamping action of the stamping mold 81 and falls into the discharging tank 83, and the finished graphite sealing element 113 is conveyed onto the second moving trolley 12 by using the fourth conveying mechanism 94; and the finished graphite sealing element 113 is transferred out by the second moving trolley 12.

The above process is continuously repeated to complete continuous production of the graphite sealing element 113 and realize full-automatic intelligent control.

In this embodiment, the finished graphite sealing element 113 obtained by the anti-oxidation production line for the graphite sealing element for the thermal power generation unit is a flexible graphite sealing element, and certainly may also be a graphite sealing element 113 made of other graphite raw materials. In short, an objective for arranging the anti-oxidation production line for the graphite sealing element for the thermal power generation unit is to completely soak the raw material of the graphite sealing element first, so as to obtain the graphite sealing element 113 with good oxidation resistance, especially, the graphite sealing element 113 with excellent high temperature oxidation resistance.

Apparently, the above embodiments are merely examples for clear description, but not for limiting the implementations. Those ordinarily skilled in the art can also make modifications or variations in other different forms based on the above description. All implementations do not need to be and cannot be exhaustively cited here. Apparent modifications or variations derived from this still fall within the protection scope of the present application.

The invention claimed is:

1. An anti-oxidation production line for a graphite sealing element for a thermal power generation unit, comprising a guide rail (2); and a soaking device (5), a drying and curing device (6), a compression molding device (7) and a finished product machining device (8) which are arranged below the guide rail (2) and in sequence along a guiding direction of the guide rail (2);

wherein the soaking device (5) comprises a soaking tank, and the soaking tank is configured to contain a dipping agent so as to completely soak a graphite sheet (111); the drying and curing device (6) comprises a drying and curing oven for drying and curing the soaked graphite sheet (111) therein; the compression molding device (7) comprises a compressing mechanism (72) mounted on the guide rail (2), a support stand (73) for stacking the multiple dried and cured graphite sheets (111) thereon, and a push mechanism (71) which pushes the support stand (73) to move to a position below the compressing mechanism (72), the compressing mechanism (72) is configured to compress the multiple stacked graphite sheets (111) on the support stand (73) to form a layered graphite body (112); the finished product machining device (8) comprises a feeding tank (82) configured to contain the layered graphite body (112) and a stamping mold (81) slidably mounted on the guide rail (2), and the stamping mold (81) is configured to perform stamping machining on the layered graphite body (112) in the feeding tank (82) to form a graphite sealing element (113) with a desired appearance; and the guide rail (2) is also slidably connected with a material transfer device suitable for grabbing materials and driving the materials to be transferred between different devices.

2. An anti-oxidation dipping treatment method for a graphite sealing element for a thermal power generation unit, based on the anti-oxidation production line for the graphite sealing element for the thermal power generation unit according to claim 1, comprising the following steps:

S1: placing a graphite sheet (111) into a soaking device (5) for soaking;

S2: conveying the soaked graphite sheet (111) into a drying and curing device (6) for drying and curing;

S3: stacking the multiple dried and cured graphite sheets (111) together, and subjecting same to compression molding to form a layered graphite body (112); and S4: stamping the layered graphite body (112) to form a finished graphite sealing element (113) with a desired appearance.

3. The anti-oxidation dipping treatment method for the graphite sealing element for the thermal power generation unit according to claim 2, wherein the graphite sealing element (113) is a flexible graphite sealing element.

4. The anti-oxidation dipping treatment method for the graphite sealing element for the thermal power generation unit according to claim 3, wherein, in step S1, soaking time ranges from 4 min to 7 min;

in step S2, drying is performed at a temperature ranging from 240° C. to 260° C. for 18 min to 22 min, and curing is performed at a temperature ranging from 380° C. to 420° C. for 8 min to 12 min;

in step S3, a load pressure ranges from 75 Mpa to 95 Mpa, and pressure maintaining time ranges from 10 min to 20 min; and in step S4, a stamping mold (81) performs stamping at a stamping rate ranging from 9 cm/s to 11 cm/s and a stamping frequency ranging from 5 times/hour to 7 times/hour.

5. The anti-oxidation production line for the graphite sealing element for the thermal power generation unit according to claim 1, wherein a first conveying mechanism (91) is further arranged in the soaking tank and configured to drive the graphite sheet (111) to perform circularly reciprocating motion in the soaking tank.

6. The anti-oxidation production line for the graphite sealing element for the thermal power generation unit according to claim 5, further comprising a second conveying mechanism (92), a third conveying mechanism (93) and a fourth conveying mechanism (94); wherein the second conveying mechanism (92) traverses the drying and curing oven and is configured to drive the graphite sheet (111) in the drying and curing oven to move towards the push mechanism (71), and the third conveying mechanism (93) is located below the compressing mechanism (72) and configured to transfer the support stand (73) and the layered graphite body (112) on the support stand towards the finished product machining device (8); the finished product machining device (8) further comprises a discharging tank located below the feeding tank (82), and the finished graphite sealing element (113) obtained after stamping machining in the feeding tank (82) enters the discharging tank (83); and the fourth conveying mechanism (94) is located below the discharging tank (83) and configured to remove the discharging tank (83) and the finished graphite sealing element (113) in the discharging tank out of the stamping mold (81).

7. The anti-oxidation production line for the graphite sealing element for the thermal power generation unit according to claim 6, wherein the material transfer device comprises a first suction device (21*a*) and a second suction device (21*b*) located on the guide rail (2) and on two opposite sides of the compressing mechanism (72); and the first suction device (21*a*) is configured to suck the graphite sheet (111) and drive the graphite sheet (111) to be transferred among the soaking tank, the drying and curing oven and the support stand (73), and the second suction device (21*b*) is configured to suck the layered graphite body (112) and drive the layered graphite body (112) to be transferred between the support stand (73) and the feeding tank (82).

8. The anti-oxidation production line for the graphite sealing element for the thermal power generation unit according to claim 6, further comprising a support base (1), wherein the soaking device (5), the drying and curing device (6), the compression molding device (7) and the finished product machining device (8) are all fixed on the support base (1).

9. The anti-oxidation production line for the graphite sealing element for the thermal power generation unit according to claim 8, further comprising a first moving trolley (11) and a second moving trolley (12) located at two ends of the support base (1) respectively; wherein the first moving trolley (11) transfers the graphite sheet (111) to the soaking device (5), the graphite sheet (111) is sucked and put in the soaking device (5) by the first suction device (21a) slidably mounted on the guide rail (2); and a top surface of the second moving trolley (12) is flush with a top surface of the fourth conveying mechanism (94), so the graphite sealing element (113) obtained by the finished product machining device (8) is transferred.

* * * * *